United States Patent
Deighton et al.

(10) Patent No.: US 11,104,817 B2
(45) Date of Patent: Aug. 31, 2021

(54) FILM LAMINATION INKS

(71) Applicant: SUN CHEMICAL CORPORATION, Parsippany, NJ (US)

(72) Inventors: Robert Deighton, Halifax (GB); Peter Salthouse, Knutsford (GB); Christine Juckes, Wigan (GB)

(73) Assignee: Sun Chemical Corporation, Parsippany, NJ (US)

( * ) Notice: Subject to any disclaimer, the term of this patent is extended or adjusted under 35 U.S.C. 154(b) by 0 days.

(21) Appl. No.: 16/970,500

(22) PCT Filed: May 16, 2019

(86) PCT No.: PCT/US2019/032572
§ 371 (c)(1),
(2) Date: Aug. 17, 2020

(87) PCT Pub. No.: WO2019/240905
PCT Pub. Date: Dec. 19, 2019

(65) Prior Publication Data
US 2020/0407575 A1    Dec. 31, 2020

Related U.S. Application Data

(60) Provisional application No. 62/685,306, filed on Jun. 15, 2018.

(51) Int. Cl.
| | | |
|---|---|---|
| *C09D 11/102* | (2014.01) | |
| *B32B 7/12* | (2006.01) | |
| *B32B 27/08* | (2006.01) | |
| *B32B 27/30* | (2006.01) | |
| *B32B 27/32* | (2006.01) | |
| *B32B 27/36* | (2006.01) | |
| *B32B 38/00* | (2006.01) | |
| *C08L 25/14* | (2006.01) | |
| *C09D 11/023* | (2014.01) | |
| *C09D 11/037* | (2014.01) | |

(52) U.S. Cl.
CPC .............. *C09D 11/102* (2013.01); *B32B 7/12* (2013.01); *B32B 27/08* (2013.01); *B32B 27/302* (2013.01); *B32B 27/304* (2013.01); *B32B 27/32* (2013.01); *B32B 27/36* (2013.01); *B32B 38/145* (2013.01); *C08L 25/14* (2013.01); *C09D 11/023* (2013.01); *C09D 11/037* (2013.01); *B32B 2255/10* (2013.01); *B32B 2255/26* (2013.01); *B32B 2305/72* (2013.01)

(58) Field of Classification Search
CPC ... C09D 11/102; C09D 11/023; C09D 11/037; B32B 7/12; B32B 27/08; B32B 27/302; B32B 27/304; B32B 27/32; B32B 27/36; B32B 38/145; B32B 2255/10; B32B 2255/26; B32B 2305/72; C08L 25/14
USPC ....................................................... 106/31.25
See application file for complete search history.

(56) References Cited

U.S. PATENT DOCUMENTS

| | | | |
|---|---|---|---|
| 10,113,077 B2 | 10/2018 | Deighton | |
| 2009/0120571 A1* | 5/2009 | Rasmussen | .......... B41M 7/0045 |
| | | | 156/283 |
| 2014/0083552 A1 | 3/2014 | Mukkolath | |
| 2016/0326389 A1 | 11/2016 | Romanato | |
| 2017/0197396 A1 | 7/2017 | Mathew | |
| 2017/0275483 A1* | 9/2017 | Deighton | ............. C09D 11/107 |

FOREIGN PATENT DOCUMENTS

| | | | |
|---|---|---|---|
| EP | 2 940 086 A1 | 11/2015 | |
| EP | 2940086 A1 * | 11/2015 | ........... C09D 11/106 |
| GB | 2 045 768 | 11/1980 | |
| WO | WO 2013/179839 | 1/2016 | |
| WO | WO 2016/028850 A1 | 2/2016 | |
| WO | WO 2016/202654 A1 | 12/2016 | |
| WO | WO 2018/016578 | 1/2018 | |
| WO | WO 2018/021033 | 2/2018 | |
| WO | WO2018/075487 | 4/2018 | |

OTHER PUBLICATIONS

International Search Report issued in International Application No. PCT/US2019/032572, dated Sep. 11, 2019.
Written Opinion of the International Searching Authority issued in International Application No. PCT/US2019/032572, dated Sep. 11, 2019.
International Preliminary Report on Patentability issued in PCT Application No. PCT/US2019/032572, dated Dec. 24, 2020.

* cited by examiner

*Primary Examiner* — Hui H Chin
(74) *Attorney, Agent, or Firm* — Marian E. Fundytus; Ostrolenk Faber LLP.

(57) ABSTRACT

Described herein are printed laminates. The laminates include a first substrate having an applied layer of an ink or coating composition that includes a self-crosslinking acrylic polymer having has a glass transition temperature of 0° C. or greater, a coalescent, and water; a second substrate positioned to configure the applied layer between the first substrate and the second substrate; and an adhesive bonding the first substrate to the second substrate. Also described is a process for making such laminates. In one aspect, the applied layer of ink is a reverse printed layer, in which the applied ink layer is highly compatible with the adhesive with which it comes in contact.

24 Claims, No Drawings

FILM LAMINATION INKS

CROSS REFERENCE TO RELATED APPLICATIONS

The present application is a § 371 National Phase application based on PCT/US19/32572 filed May 16, 2019, which claims the benefit of U.S. Provisional Application No. 62/685,306 filed Jun. 15, 2018, the subject matter of each of which is incorporated by reference in their entirety.

FIELD OF THE INVENTION

The present invention is directed to the field of inks and coatings, laminates made from such inks and coatings, and laminate materials prepared by reverse printing.

BACKGROUND OF THE INVENTION

Reverse printing is the application of an ink or coating composition to one side of a transparent substrate such that the text, image, etc. formed from the ink or coating is legible when viewed through the non-printed side of the transparent substrate. In a laminate structure, the printed side formed by reverse printing is configured as an inner layer of the laminate.

Reverse printing can be used to form labels and other product packaging. Because the substrate is between the printed material and the outside of the packaging, the inks and coatings used in the printing are isolated from the outside environment. This reduces the wear and tear on the ink, rendering the ink less likely to wear or smudge since contact with the outside environment is reduced, if not eliminated.

However, with reverse printed materials, the ink or coating applied to the substrate is closer to the packaged goods. If not covered, then ink components can migrate into the package to contaminate the packaged goods. With foods, medicines, and other sensitive items, there are governmental and trade group regulations that dictate the amounts of migratable components that are acceptable and/or tolerable. Such amounts may be on the order of a few parts per billion (ppb).

For this and other reasons, laminate structures are formed in which a second substrate is laminated to a first printed substrate. In this arrangement, the printed ink or coating composition is positioned between the first (printed) substrate and the second substrate, and the substrates are bonded together with an adhesive, for example a polyurethane adhesive. Further in this arrangement, the adhesive contacts the ink layer.

Laminate structures can reduce the migration of the ink components. Also, they provide a backing to the printed ink, which can improve the visual properties of the printed material. For example, a white backing to a colored ink layer provides improved contrast.

In forming a laminate having a reverse printed substrate layer, the ink must not be degraded by the adhesive. That is, it should not run, bleed, or smudge at unacceptable levels. Such problems could be caused by the adhesive dissolving the ink. Likewise, the ink must be compatible with the adhesive. The ink should not degrade the ability of the adhesive to bond the substrates together.

The following references may be of interest:
U.S. Pat. No. 10,113,077, US20170275483, and WO2018/075487. These patent applications, patent, and the present application have the same owner.

Also of interest may be GB 2 045 768; US 2016/0326389; WO 2018/016578; US 2017/0197396; US 2014/0083552; WO 2013/179839; and WO 2018/021033.

SUMMARY OF THE INVENTION

Described herein is a laminate including an ink or coating composition well-suited for reverse printing. The laminate includes:

a) a first substrate having an applied layer of an ink or coating composition comprising a self-crosslinking acrylic polymer having has a glass transition temperature (Tg) of 0° C. or greater, a coalescent, and water;

b) a second substrate positioned to configure the applied layer between the first substrate and the second substrate; and c) an adhesive bonding the first substrate to the second substrate.

In one aspect, the configuration of the ink or coating composition is a reverse printed configuration.

In one aspect, the first substrate is a polymeric substrate.

In another aspect, the first substrate is a polymeric substrate selected from oriented polypropylene (OPP), polyethylene, polyvinylchloride (PVC), oriented polystyrene (OPS), polyethylene terephthalate (PET), and polylactic acid (PLA).

In another aspect, the second substrate is a polymeric substrate.

In another aspect, the second substrate is a polymeric substrate selected from OPP, polyethylene, PVC, OPS, PET, and PLA.

In one aspect, at least one of the first and second substrates is OPP. In another aspect, the first and second substrates are OPP.

In one aspect, the self-crosslinking acrylic polymer has a Tg of 20° C. to 70° C.

In one aspect, the self-crosslinking acrylic polymer has a Tg of 40° C. to 60° C.

In one aspect, the self-crosslinking acrylic polymer is formed from monomers selected from acrylic acid, methyl acrylic acid, methyl methacrylate, butyl acrylate, butyl methacrylate, styrene, methyl styrene, and combinations thereof.

In one aspect, the self-crosslinking polymer is a styrene/acrylic ester copolymer.

In one aspect, the self-crosslinking acrylic polymer is the reaction product of a carbonyl-containing monomer and an amine-containing monomer.

In one aspect, the self-crosslinking polymer is an acrylic emulsion.

In one aspect, the coalescent has a Tg of 20° C. or less.
In one aspect, the coalescent has a Tg of 0° C. or less.
In one aspect, the coalescent is an acrylic emulsion.
In one aspect, the amount of self-crosslinking acrylic polymer present in the ink or coating composition is 20 wt % to 60 wt %.

In one aspect, the amount of self-crosslinking acrylic polymer present in the ink or coating composition is 30 wt % to 50 wt %.

In one aspect, the amount of coalescent present in the ink or coating composition is 2.0 wt % to 20 wt %.

In one aspect, the amount of coalescent present in the ink or coating composition is 5.0 wt % to 15 wt %.

In one aspect, the ink or coating composition further comprises a colorant.

In one aspect, the ink or coating composition further comprises a pigment.

In one aspect, the ink or coating composition further comprises a pigment present in dispersion.

In one aspect, the ink or coating composition is applied by gravure or flexographic printing.

In one aspect, described is a laminate structure prepared by the process of any preceding claim.

In another aspect, described herein is a process for forming a laminate. The process includes the steps of:

a) providing an ink or coating composition that comprises: a self-crosslinking acrylic polymer having has a Tg of 0° C. or greater, a coalescent, and water;

b) applying one or more layers of the ink or coating composition to a first substrate to provide a coated substrate;

c) drying the one or more layers of the coated substrate; and d) laminating the coated substrate.

In another aspect, the laminating of the coated substrate includes applying an adhesive layer to the coated substrate and applying a second substrate to the coated substrate. In this arrangement, the ink or coating composition may be applied by reverse printing on the substrate.

In one aspect, the first substrate is a polymeric substrate.

In another aspect, the first substrate is a polymeric substrate selected from OPP, polyethylene, PVC, OPS, PET, and PLA.

In another aspect, the second substrate is a polymeric substrate.

In another aspect, the second substrate is a polymeric substrate selected from oriented OPP, polyethylene, PVC, OPS, PET, and PLA.

In a particular aspect, at least one of the first and second substrates is OPP. In another particular aspect, the first and second substrates are OPP.

In another aspect, the self-crosslinking acrylic polymer has a Tg of 20° C. to 70° C., preferably 40° C. to 60° C.

In another aspect, the self-crosslinking acrylic polymer is formed from monomers selected from acrylic acid, methyl acrylic acid, methyl methacrylate, butyl acrylate, butyl methacrylate, styrene, methyl styrene, and combinations thereof.

In another aspect, the self-crosslinking polymer is a styrene/acrylic ester copolymer.

In another aspect, the self-crosslinking acrylic polymer is the reaction product of a carbonyl-containing monomer and an amine-containing monomer.

In another aspect, the self-crosslinking polymer is an acrylic emulsion.

In another aspect, the coalescent has a Tg of 20° C. or less, preferably 0° C. or less.

In another aspect, the coalescent is an acrylic emulsion.

In another aspect, the amount of self-crosslinking acrylic polymer present in the ink or coating composition is 20 wt % to 60 wt %, preferably 30 wt % to 50 wt %, based on the total weight of the composition.

In another aspect, the amount of coalescent present in the ink or coating composition is 2.0 wt % to 20 wt %, preferably 5.0 wt % to 15 wt %, based on the total weight of the composition.

In another aspect, the ink or coating composition further includes a colorant, for example a pigment or a dye.

In a further aspect, the colorant is a pigment.

In a still further aspect, the colorant is a pigment in dispersion.

In another aspect, the ink or coating composition is applied by gravure or flexographic printing.

These and others aspects of the subject matter disclosed herein shall be revealed in the following description and claims.

DETAILED DESCRIPTION

The laminates described herein and the processes for preparing same incorporate water-based ink and coating compositions. The ink and coating compositions are particularly well-suited for reverse printing on laminate structures, such as laminate structures included in product packaging.

Reverse Printing

As used herein, "reverse printing" means that the ink or coating is applied to one side of a transparent substrate in which the text and printed images, etc. are legible when viewed through the non-printed side of the transparent substrate. The printed side is thus an inner layer of the laminate.

A second substrate layer is employed in forming a laminate with a reverse printed substrate. The second substrate layer may or may not be a printed or coated layer, such as a white opacifying substrate layer, or metallized layer. The second substrate layer provides the ink layers with protection (e.g., prevent migration of ink components) and provide contrast for observing the text or image formed from the ink.

A laminate is formed by laminating together the printed or coated substrates layers with an adhesive. In this arrangement, the printed inks or coating composition is in direct contact with the adhesive layer. The inks or coatings used in the inventive process are resistant to the potential degrading effects of the adhesive. Likewise, the ink or coating does not degrade the bonding capability of the adhesive material.

In one aspect, the laminate structures described herein are included in laundry detergent product packaging. The described laminates have been demonstrated to be able to resist and withstand degradation when exposed to detergent.

It has now been found that inks or coating compositions containing a self-crosslinking acrylic polymer and a coalescent exhibiting the properties stated in this description (e.g., a self-crosslinking acrylic polymer and coalescent having the respectively indicated Tgs, such as a self-crosslinking acrylic polymer having a Tg greater than 0° C.) can exhibit very good if not excellent adhesive properties and excellent requisite resistance properties.

The inventors have found that inks and coating compositions including a self-crosslinking acrylic polymer having a Tg greater than 0° C., a coalescent, and water exhibits good adhesive properties on polymeric substrate films such as OPP and are compatible with adhesives such as polyurethane adhesives, which makes the described inks and coating compositions suitable for forming laminates in which the inks and coatings are, for example, reverse printed on a transparent substrate.

Self Cross-Linking Polymers

Self-crosslinking polymers contain a one or more functionalities which are self-reactive. A separate co-reactant is not required. Self-crosslinking polymers may be present in an aqueous dispersion or emulsion and may be the product of two or more monomers that react with one another. For example, a self-crosslinking polymer may contain both a carbonyl functional group and an amine functional group.

A self-crosslinking acrylic polymer may be a one-pack acrylic that cures under ambient conditions. A reaction between a carbonyl group and an amine group is an example one that cures under such conditions. Carbonyl-amine self-crosslinking acrylic polymers may be employed in the inks and coating used in the described laminates. Such self-crosslinking can occur, for example between ketone groups and bi- or poly-functional amine compounds having groups that are reactive towards carbonyl groups. These acrylic polymers exhibit enhanced resistance properties in the resulting dried films.

A shell-core polymer can be self-crosslinking. One mechanism is by the use of phase separated polymers, such as core-shell polymers. The shell polymer is hydrophilic, while the core polymer is hydrophobic. The hydrophilic shell maintains the dispersion, while the hydrophobic core provides the reactive sites for crosslinking. There are other kinds of self-crosslinking polymers as well. All are contemplated by this disclosure, so long as they have a Tg of 0° C. or greater.

In one aspect of self-crosslinking acrylic polymer reaction mechanisms, polymers containing ketone groups crosslink at room temperature when combined with bi- or poly-functional compounds that react with carbonyl. Bishydrazides are one example of such reactive compounds. Such self-crosslinking acrylic emulsions are provided as one pack products.

The self-crosslinking reaction, depending upon the acrylic type, may also be initiated by the evaporation of water upon drying, a change of pH of the vehicle, or by curing at elevated temperatures, where the cross-linking reaction is rapid or the reactive groups are unblocked.

One example of self-crosslinking is described in GB 2 045 768, which describes a dispersion based upon the emulsion polymerization product of a monomer mixture primarily comprising lower alkyl (meth)acrylate monomers, minor amounts of (meth)acrylic acid, and glycidyl (meth) acrylate. GB 2 045 768 is incorporated herein by reference.

Polymer particles with a continuous gradient morphology have been developed. With this mechanism, the ketone groups are enriched in the low Tg domains of the polymer particle. The self-crosslinking polymers are prepared by emulsion polymerization. Using gradient morphology, little or no coalescing solvents are necessary, and minimum film forming temperatures below 5° C. are possible, while still maintaining desirable resistance properties.

Another method of preparing self-crosslinking acrylic dispersions is to perform emulsion polymerization, but also include in the mixture an acrylic oligomer containing reactive and/or co-reactive groups. In this process, the reactive oligomer becomes grafted onto the gradient morphology core particle.

Self-crosslinking acrylic polymers may include, for example, binders selected from styrene-acrylic ester copolymer, styrene/acrylic ester copolymers including acrylamide groups, and a copolymer based on acrylonitrile, methacrylamide, and acrylic ester.

Self-crosslinking acrylic polymers may be formed from reactive monomers including monomers selected from acrylic acid, methyl acrylic acid (MAA), methyl methacrylate (MMA), butyl acrylate, butyl methacrylate, styrene, and methyl styrene.

In one aspect, the self-crosslinking polymer is a styrene/acrylic ester copolymer.

In one aspect, the self-crosslinking polymer present in the inks and coatings described herein is produced via carbonyl/amine reaction. For example, an acrylate with a pendant N-methylol group (e.g., N-isobutoxy methylol acrylamide (NiBMA)).

Examples of commercial acrylates formed from such monomers include, but are not limited to, Alberdingk AC2714VP, Synthomer AM00035, Organikkimyan Orgal P086V, DSM Neocryl® XK12 and DSM Neocryl® XK14, each available from DSM. Neocryl® XK14 is now known as Neocryl® A1120. All of these commercial products are self-crosslinking.

The Tg of the self-crosslinking acrylic polymer is the Tg prior to undergoing self-crosslinking. Higher Tgs self-crosslinking polymers do not experience premature gelling of the acrylic polymer. In one aspect, the self-crosslinking acrylic polymer has a Tg of 0° C. or greater. In several aspects, the self-crosslinking acrylic polymer may have a Tg of: about 20° C. to 70° C.; about 20° C. to about 65° C.; about 20° C. to about 60° C.; about 20° C. to about 55° C.; about 20° C. to about 50° C.; about 20° C. to about 45° C.; about 20° C. to about 40° C.; about 20° C. to about 35° C.; about 20° C. to about 30° C.; about 20° C. to about 25° C.; about 25° C. to about 70° C.; about 25° C. to about 65° C.; about 25° C. to about 60° C.; about 25° C. to about 55° C.; about 25° C. to about 50° C.; about 25° C. to about 45° C.; about 25° C. to about 40° C.; about 25° C. to about 35° C.; about 25° C. to about 30° C.; about 30° C. to about 70° C.; about 30° C. to about 65° C.; about 30° C. to about 60° C.; about 30° C. to about 55° C.; about 30° C. to about 50° C.; about 30° C. to about 45° C.; about 30° C. to about 40° C.; about 30° C. to about 35° C.; about 35° C. to about 70° C.; about 35° C. to about 65° C.; about 35° C. to about 60° C.; about 35° C. to about 55° C.; about 35° C. to about 50° C.; about 35° C. to about 45° C.; about 35° C. to about 40° C.; about 40° C. to about 70° C.; about 40° C. to about 65° C.; about 40° C. to about 60° C.; about 40° C. to about 55° C.; about 40° C. to about 50° C.; about 40° C. to about 45° C.; about 45° C. to about 70° C.; about 45° C. to about 65° C.; about 45° C. to about 60° C.; about 45° C. to about 55° C.; about 45° C. to about 50° C. In one aspect, the self-crosslinking acrylic polymer has a Tg of about 40° C. to about 60° C.

Of the above, it may be preferable that the self-crosslinking acrylic polymer has a Tg of >0° C.; more preferably of 20° C. to 70° C., and most preferably 40° C. to 60° C.

The inks and coating compositions described herein may include about 20 wt % to about 70 wt % of acrylic polymer (that is, the total amount of self-crosslinking and non-self-crosslinking acrylic polymers), based on the total weight of the ink or coating composition. For example, the ink or coating of the invention may include acrylic polymer in amounts of about 20 wt % to about 70 wt %; 20 wt % to about 65 wt %; about 20 wt % to about 60 wt %; about 20 wt % to about 55 wt %; about 20 wt % to about 50 wt %; about 20 wt % to about 45 wt %; about 20 wt % to about 40 wt %; about 20 wt % to about 30 wt %; about 20 wt % to about 25 wt %; about 20 wt % to about 20 wt %; about 20 wt % to about 70 wt %; about 20 wt % to about 65 wt %; about 20 wt % to about 60 wt %; about 20 wt % to about 55 wt %; about 20 wt % to about 50 wt %; about 20 wt % to about 45 wt %; about 20 wt % to about 40 wt %; about 20 wt % to about 35 wt %; about 20 wt % to about 30 wt %; about 20 wt % to about 25 wt %; about 25 wt % to about 70 wt %; about 25 wt % to about 65 wt %; about 25 wt % to about 60 wt %; about 25 wt % to about 55 wt %; about 25 wt % to about 50 wt %; about 25 wt % to about 45 wt %; about 25 wt % to about 40 wt %; about 25 wt % to about 35 wt %; and about 25 wt % to about 30 wt %.

About 55 wt % to 75 wt % of the total amount of acrylic polymer present in the described inks and coating compositions is self-crosslinking (this value is based on the total amount of the acrylic polymer (e.g., self-crosslinking acrylic polymer+non-self-crosslinking acrylic polymer). This may be based on the weight of commercial product employed. For example, self-crosslinking acrylic polymer may be present in an amount of about 55 wt % to about 75 wt %; about 55 wt % to about 70 wt %; about 55 wt % to about 65 wt %; about 55 wt % to about 60 wt %; about 60 wt % to about 75 wt %; about 60 wt % to about 70 wt %; and about 60 wt % to about 65 wt %.

The inks and coatings described herein may contain about 20 wt % to about 60 wt % self-crosslinking acrylic polymer, based on the total weight of the ink or coating compositions. For example, the ink or coating may contain about 20 wt % to about 60 wt %; 20 wt % to about 55 wt % self-crosslinking acrylic polymer; about 20 wt % to about 50 wt %; about 20 wt % to about 45 wt %; about 20 wt % to about 40 wt %; about 20 wt % to about 35 wt %; about 20 wt % to about 30 wt %; about 20 wt % to about 25 wt %; about 25 wt % to about 60 wt %; about 25 wt % to about 55 wt %; about 25 wt % to about 50 wt %; about 25 wt % to about 45 wt %; about 25 wt % to about 40 wt %; about 25 wt % to about 35 wt %; about 25 wt % to about 30 wt %; and about 25 wt % to about 20 wt %.

Coalescents

The inks and coating compositions described herein contain a coalescent (coalescing agent). The presence of the coalescent is believed to optimize formation of films from the inks and coatings and to serve as a temporary plasticizer for the polymer particles. They further reduce the minimum film formation temperature (MFFT) of the polymer emulsion.

Examples of coalescents include acrylic emulsions, solvents, e.g., esters, ester alcohols, and glycol ethers. Mixtures thereof may be used. Examples of such solvent coalescents include but are not limited to Eastman Texanol ester alcohol, Eastman EEH solvent, and Eastman DB solvent. Low Tg acrylic emulsions may also be used as coalescents.

Advantageously, the coalescent is also an acrylic emulsion that has a Tg of 20° C. or less, preferably 0° C. or less.

Examples of commercial coalescents include Dow Lucidene 605, DSM Neocryl® A1125 and Neocryl® A2095, and Joncryl 8052® and Joncryl 8052® ECO2124 from BASF. These are acrylic emulsions having a Tg of 20° C. or less.

Typically, the inks and coatings described herein include about 2.0 wt % to about 20 wt % of coalescent, based on the total weight of the ink or coating composition. Preferably the inks and coatings include about 5.0 wt % and about 15 wt % coalescent. For example, the inks and coating compositions may include coalescent in an amount of about 2.0 wt % to about 18 wt %; about 2.0 wt % to about 15 wt %; about 2.0 wt % to about 12.5 wt %; about 2.0 wt % to about 10 wt %; about 2.0 wt % to about 7.5 wt %; about 2.0 wt % to about 5.0 wt %; about 5.0 wt % to about 2.0 wt %; about 5.0 wt % to about 15 wt %; about 5.0 wt % to about 10 wt %.

The inks and coating compositions described herein include water. Water may be added directly, or may be included as a component of the composition. For example, water is present in some or all of the commercially available compositions, such as the commercially-available self-crosslinking acrylic polymer emulsion and/or the coalescent used in formulating the present inks and coatings. Typically, the inks and coating compositions described herein comprise about 25 wt % to about 50 wt % water, based on the total weight of the ink or coating composition. For example, the inks and coating compositions of the invention may comprise water in an amount of about 25 wt % to about 45 wt %; about 25 wt % to about 40 wt %; about 25 wt % to about 35 wt %; about 25 wt % to about 30 wt %; about 30 wt % to about 50 wt %; about 30 wt % to about 45 wt %; about 30 wt % to about 40 wt %; about 30 wt % to about 35 wt %; about 35 wt % to about 50 wt %; about 35 wt % to about 45 wt %; about 35 wt % to about 40 wt %; about 40 wt % to about 50 wt %; about 40 wt % to about 45 wt %; about 45 wt % to about 50 wt %.

Colorants

The inks and coating compositions described herein optionally further comprise one or more colorants. Such colorants include pigments and/or dyes. Examples of suitable organic or inorganic pigments include carbon black, zinc oxide, titanium dioxide, phthalocyanine, anthraquinones, perylenes, carbazoles, monoazo and disazobenzimidazoles, rhodamines, indigoids, quinacridones, diazopyranthrones, dinitranilines, pyrazoles, diazopyranthrones, dinityanilines, pyrazoles, dianisidines, pyranthrones, tetracholoroisoindolines, dioxazines, monoazoacrylides and anthrapyrimidines. The dyes include but are not limited to azo dyes, anthraquinone dyes, xanthene dyes, azine dyes, combinations thereof and the like.

When present, organic pigments and dyes are typically present in an amount of about 0.1 wt % to about 7.0 wt %, based on the total weight of the ink or coating. For example, the organic pigments and dyes may be present in an amount of 0.1 wt % to 6.5 wt %; or 0.1 wt % to 6.0 wt %; or 0.1 wt % to 5.5 wt %; or 0.1 wt % to 5.0 wt %; or 0.1 wt % to 4.5 wt %; or 0.1 wt % to 4.0 wt %; or 0.1 wt % to 3.5 wt %; or 0.1 wt % to 3.0 wt %; or 0.1 wt % to 2.5 wt %; or 0.1 wt % to 2.0 wt %; or 0.1 wt % to 1.5 wt %; or 0.1 wt % to 1.0 wt %; or 0.1 wt % to 0.5 wt %; or 0.5 wt % to 7.0 wt %; or 0.5 wt % to 6.5 wt %; or 0.5 wt % to 6.0 wt %; or 0.5 wt % to 5.5 wt %; or 0.5 wt % to 5.0 wt %; or 0.5 wt % to 4.5 wt %; or 0.5 wt % to 4.0 wt %; or 0.5 wt % to 3.5 wt %; or 0.5 wt % to 3.0 wt %; or 0.5 wt % to 2.5 wt %; or 0.5 wt % to 2.0 wt %; or 0.5 wt % to 1.5 wt %; or 0.5 wt % to 1.0 wt %; or 1.0 wt % to 7.0 wt %; or 1.0 wt % to 6.5 wt %; or 1.0 wt % to 6.0 wt %; or 1.0 wt % to 5.5 wt %; or 1.0 wt % to 5.0 wt %; or 1.0 wt % to 4.5 wt %; or 1.0 wt % to 4.0 wt %; or 1.0 wt % to 3.5 wt %; or 1.0 wt % to 3.0 wt %; or 1.0 wt % to 2.5 wt %; or 1.0 wt % to 2.0 wt %; or 1.0 wt % to 1.5 wt %.

When present, inorganic pigments are typically present in an amount of 1.0 wt % to 40 wt %, based on the total weight of the ink or coating. For example, the inorganic pigments may be present in an amount of 1.0 wt % to 35 wt %; or 1.0 wt % to 30 wt %; or 1.0 wt % to 25 wt %; or 1.0 wt % to 20 wt %; or 1.0 wt % to 15 wt %; about 1.0 wt % to about 10 wt %; about 1.0 wt % to about 5.0 wt %; or 5.0 wt % to 40 wt %; or 5.0 wt % to 35 wt %; or 5.0 wt % to 30 wt %; or 5.0 wt % to 25 wt %; or 5.0 wt % to 20 wt %; or 5.0 wt % to 15 wt %; about 5.0 wt % to about 10 wt %; about 10 wt % to about 40 wt % or 10 wt % to 35 wt %; or 10 wt % to 30 wt %; or 10 wt % to 25 wt %; or 10 wt % to 20 wt %; or 10 wt % to 15 wt %; or 15 wt % to 40 wt %; or 15 wt % to 35 wt %; or 15 wt % to 30 wt %; or 15 wt % to 25 wt %; or 15 wt % to 20 wt %; or 20 wt % to 40 wt %; or 20 wt % to 35 wt %; or 20 wt % to 30 wt %; or 20 wt % to 25 wt %.

The inks and coating compositions may optionally contain one or more other additives. Such additives include, but are not limited to, wetting aids, alcohols, polyethylene wax emulsions, wax dispersions, anti-foaming agents, ammonia, defoamers, dispersants, stabilizers, silicones, rheological modifiers, plasticizers, and the like.

Examples of such additives include isopropanol and n-propanol; polyethylene wax emulsions such as Munzing Lubraprint 2036 and Byk Aquacer 531; wax dispersions such as Munzing Lubraprint 499, Keim Ultralube D816 and Crayvallac WW1001; antifoams such as Byk 023 and Evonik Tegofoamex 1488 (polyether siloxane defoamer emulsion by Evonik); wetting aids such as Tego®Wet from Evonik, Byk Dynwet 800 and Air Products Surfynol AD01; biocides such as WR-0268 from Thor Chemicals, and dispersants such as Byk Disperbyk 190.

When present, additives are included in amount of about 0.1 wt % to about 5.0 wt %, based on the total weight of the ink or coating composition. For example, the additives may be present in an amount of about 0.1 wt % to about 4.5 wt %; about 0.1 wt % to about 4.0 wt %; about 0.1 wt % to about 3.5 wt %; about 0.1 wt % to about 3.0 wt %; about 0.1 wt % to about 2.5 wt %; about 0.1 wt % to about 2.0 wt %; about 0.1 wt % to about 1.5 wt %; about 0.1 wt % to about 1.0 wt %; about 0.1 wt % to about 0.5 wt %; about 0.5 wt % to about 5.0 wt %; about 0.5 wt % to about 4.5 wt %; about 0.5 wt % to about 4.0 wt %; about 0.5 wt % to about 3.5 wt %; about 0.5 wt % to about 3.0 wt %; about 0.5 wt % to about 2.5 wt %; about 0.5 wt % to about 2.0 wt %; about 0.5 wt % to about 1.5 wt %; about 0.5 wt % to about 1.0 wt %.

Substrates

As indicated the laminates described herein include a first substrate on which the inks and coatings are printed, and a second substrate laminated to the first substrate. In one aspect, the first substrate is one suited for receiving and retaining a printed ink or coating, and which can form a laminate with another substrate layer through adhesive bonding. Exemplary substrates include, for example, oriented polypropylene (OPP), polyethylene, polyvinylchloride (PVC), oriented polystyrene (OPS), polyethylene terephthalate (PET), and polylactic acid (PLA).

In another aspect, the (second) substrate is a polymeric substrate.

In another aspect, the (second) substrate is a polymeric substrate selected from OPP, polyethylene PVC, OPS, PET, and PLA.

In a particular aspect, at least one of the first and second substrates is OPP. In another particular aspect, the first and second substrates are OPP.

The inks and coatings used in preparing the laminates described may be used in any kind of print method or application method, but are well suited for printing by the gravure and flexographic processes.

The inks and coatings described herein provide excellent ink adherence in laminate structures, especially to OPP, with effective resistance properties. Of note is that the described inks and coatings are resistant to detergent (e.g., powder, liquid) and thus the laminates produced in accordance with the present disclosure are well-suited for forming detergent powder product packaging.

The inks and coatings described are well-suited for application to polymeric filmic substrates, such as for example OPP. The inks and coatings demonstrate excellent adherence and resistance to wear when applied to such substrates. The inks and coatings are also suited for application to other substrates, for example flexible polymeric films such as for example, PVC, OPS, and PLA that will be used for a wide range of lamination products.

The inks and coatings described have indirect food contact status. Further, they have been successfully migration tested and all the materials used in therein are approved of and comply with the Toxic Substances Control Act (TOSCA) and Food and Drug Administration (FDA) approved.

The inks and coating compositions described herein are preferably printed by flexography or gravure but are not restricted to these two printing methods.

EXAMPLES

The following examples are intended to exemplify particular embodiments of the compositions described herein and are not intended to limit the scope thereof in any respect and should not be so construed.

Example 1: Formulation of Water-Based White Ink According to the Present Invention

| Material | White Ink | Typical Range |
|---|---|---|
| Neocryl® A1129 | 32.0 | 20-60 |
| Neocryl® A1125 | 6.7 | 5-15 |
| Joncryl® 8052 | 6.6 | 5-15 |
| Disperbyk 190 | 2.2 | 1-5 |
| Tego Foamex | 0.3 | 0.1-1.0 |
| WR-0268 Biocide | 0.2 | 0.1-1.0 |
| N-Propanol | 4.9 | 3-6 |
| Dynwet 800 | 1.8 | 1-5 |
| Monopropylene glycol | 1.4 | 0.5-5.0 |
| Water | 10.1 | 5-15 |
| Titanium Dioxide Pigment | 33.8 | 15-50 |
| Total wt % | 100.0 | |

Neocryl® A1129 Acrylic emulsion—a self-cross linking styrene acrylic dispersion;

Neocryl® A1125—water-based self-cross linking acrylic co-polymer solution;

Joncryl® 8052—a coalescent (film forming acrylic emulsion);

Disperbyk 190—volatile organic compound (VOC) and solvent-free wetting and dispersing additive;

Tego Foamex 1488—defoamer emulsion based on polyether siloxane technology;

WR-0268—a biocide; and

Dynwet 800—Silicone-free substrate wetting agent for aqueous coatings.

Example 2: Formulation of Pigment-Containing Water-Based Ink According to the Present Invention

| Material | Cyan Ink | Typical Range |
|---|---|---|
| Neocryl XK14 | 45.7 | 20-60 |
| Joncryl 8052 | 9.3 | 5-15 |
| N-Propanol | 3.6 | 1-5 |
| Tego Foamex 1488 | 0.2 | 0.1-1.0 |
| Dynwet 800 | 1.2 | 0.2-3.0 |
| Pigment Dispersion: | 40.0 | 10-50 |
| Total wt % | 100.0 | |

Neocryl XK14 self-crosslinking acrylic emulsion-, emulsifier free, acrylic copolymer.

Four different pigment dispersions were prepared: cyan, magenta, yellow, and black. The pigment amounts were the same for all colors.

The inks of Examples 1 and 2 were reduced to printing viscosity with the addition of water (viscosity reduced to 18 seconds at 25° C. and determined with Zahn 2 cup). Prints were made on corona treated OPP using an Esiproof printer (RK Print Coat Instruments Ltd) with a 400# anilox. Printed substrates were dried at room temperature (25° C., RH 50%).

Printed substrates were prepared with one and two print layers of inks, followed by a layer of white ink from the same ink series (e.g., Ex.2 Cyan pigment ink (1 layer)/Ex. 1 white ink (1 layer); Barracuda Cyan/Barracuda White; Aqualam Cyan/Aqualam White, etc.). The printed substrates were aged for 24 hours before laminates were prepared with the printed substrates. The adhesive used, Purelam 6000 (Ashland Chemicals) a commercially available solventless polyurethane adhesive, was printed onto the printed and dried substrate using a yellow K bar (RK Print Coat Instruments, Ltd.) and laminated to treated oriented polypropylene film at room temperature at 60 psi pressure to provide laminates having a reverse printed configuration. The laminate samples were left to age at room temperature for 3 days. After this time both standard and detergent exposed samples were tested for bond strength on Lloyds LRX Tensometer using a sample size of 1.5×20 cm.

Laminates prepared with the Example 1 (White) ink and the Example 2 (Cyan pigment) ink were compared to laminates prepared with commercially available inks that have been used in making laminates. The comparative inks are Barracuda, Aqualam, and Duratort, available from Sun Chemical. The Barracuda ink includes a self-crosslinking acrylic polymer emulsion having a Tg below 0° C. The Aqualam ink includes a polyurethane dispersion having a Tg below 0° C. The Duratort ink is an organic solvent-based ink.

Test Methods

Tests were performed on the laminates in accordance with the following methods.

Bond Strength Test—Bond Strength was determined according to the test set forth in ASTM D903, except that the sized of the test samples was 1.5×20 cm.

Detergent Test—Ozon, a commercially available laundry detergent powder available from Hand Arnold Trinidad Limited, was used in this test.

Laminates were constructed as described above and aged at room temperature for 3 days. A 1:1 detergent:water slurry was prepared. Two grams of the slurry was spread onto the laminate (15×30 cm) over a 3.0×3.0 cm area. The slurry was placed in the center so as to not contact the edges of the laminate, thereby avoiding ingress. After 24 hours the slurry was wiped off the laminate surface. Test strips 1.5×20 cm were cut ensuring the slurry covered area was being tested.

TABLE 2

Test Results - Lamination bond results after detergent test

| Example | Lamination Bond Strength Results | | | |
|---|---|---|---|---|
| | Avg. Force (N) | Min. Force (N) | Max. Force (N) | Comments |
| Example 3 | 7.96 | 7.27 | 9.69 | |
| Example 4 | 8.09 | 7.74 | 9.70 | |
| Example 5 | 6.70 | 6.15 | 8.16 | |
| Example 6 | 6.80 | 6.52 | 8.17 | |
| Example 6 | 6.90 | 6.31 | 8.40 | |
| Example 7 | 7.01 | 6.71 | 8.41 | |
| Example 8 | 6.82 | 6.23 | 8.31 | |
| Example 9 | 6.93 | 6.63 | 8.31 | |
| Example 10 | 6.52 | 6.21 | 6.71 | |
| Comparative Example 1 | 7.75 | 6.80 | 10.60 | |
| Comparative Example 2 | 7.44 | 6.88 | 8.47 | |
| Comparative Example 3 | Film tear | Film tear | 8.54 | Film Tear |
| Comparative Example 4 | 7.99 | 7.23 | 8.90 | |
| Comparative Example 5 | 7.67 | 7.03 | 8.65 | |
| Comparative Example 6 | 1.23 | Film Tear | 3.06 | |

Film Tear indicates that the film tears during the adhesion test. Consequently, no numerical bond strength value is obtained.

The results demonstrate that the laminates described herein (the "inventive laminates") exhibit the most consistently high bond strength results.

Exposure to detergent does not have a detrimental effect on bond strength. Surprisingly, several of the laminate examples exhibit higher bond strengths than the standard laminate when exposed to the detergent.

The test results reported in Tables 1 and 2 show that laminates prepared with the inks described herein exhibit bond strengths that start high and consistently remain high with and without exposure to detergent. Bond strengths also remain high when multiple ink layers are applied.

The laminates prepared with the Barracuda inks perform adequately when only a single print of cyan is applied. A significant drop in bond strength can be seen where an extra layer of cyan is added.

The laminates prepared with the Aqualam inks do not exhibit bond strengths as high as the presently described inks and the Barracuda inks when tested with a single layer of cyan. Due to film tear of the laminate, a full profile of the bond strength with 2× cyan was not completed.

TABLE 1

Test Results - Lamination bond results without detergent test

| Example | Print Construct | Avg. Force (N) | Min. Force (N) | Max. Force (N) |
|---|---|---|---|---|
| Example 3 | Ex. 2 Cyan (1 layer)/Ex. 1 (1 layer) | 7.70 | 7.13 | 9.51 |
| Example 4 | Ex. 2 Cyan (2 layers)/Ex. 1 (1 layer) | 7.32 | 6.60 | 7.63 |
| Example 5 | Ex. 2 Magenta (1 layer)/Ex. 1 (1 layer) | 6.52 | 6.03 | 8.04 |
| Example 6 | Ex. 2 Magenta (2 layers)/Ex. 1 (1 layer) | 5.13 | 4.74 | 5.07 |
| Example 7 | Ex. 2 Yellow (1 layer)/Ex. 1 (1 layer) | 6.72 | 6.26 | 8.23 |
| Example 8 | Ex. 2 Yellow (2 layers)/Ex. 1 (1 layer) | 6.34 | 5.78 | 6.69 |
| Example 9 | Ex. 2 Black (1 layer)/Ex. 1 (1 layer) | 6.64 | 6.16 | 8.13 |
| Example 10 | Ex. 2 Black (2 layers)/Ex. 1 (1 layer) | 6.32 | 5.74 | 6.53 |
| Comparative Example 1 | Barracuda Cyan (1 layer)/White (1 layer) | 6.66 | 4.95 | 8.91 |
| Comparative Example 2 | Barracuda Cyan (2 layers)/White (1 layer) | 3.53 | 2.94 | 6.28 |
| Comparative Example 3 | Aqualam Cyan (1 layer)/White (1 layer) | 6.80 | 6.13 | 7.68 |
| Comparative Example 4 | Aqualam Cyan (2 layers)/White (2 layers) Film tear | 3.26 | Film Tear | 7.50 |
| Comparative Example 4 | Duratort Cyan (1 layer)/White (1 layer) | 5.56 | 3.70 | 8.11 |
| Comparative Example 6 | Duratort Cyan (1 layer)/White (2 layers) | 1.86 | 0.78 | 3.56 |

What is claimed is:

1. A laminate comprising:
   a) a first substrate having a printed side comprising an applied layer of an ink or coating composition comprising a self-crosslinking acrylic polymer having a glass transition temperature of 0° C. or greater, a coalescent, and water;
   b) a second substrate adhered to the printed side of the first substrate; and
   c) an adhesive bonding the first substrate to the second substrate,
   wherein the printed side of the first substrate is an inner layer of the laminate and the layer of ink or coating layer composition contacts the adhesive bonding the first substrate to the second substrate.

2. The laminate of claim 1, wherein the ink or coating composition is in a reverse printed configuration.

3. The laminate of claim 1, wherein the first substrate or second substrate is a polymeric substrate selected from oriented polypropylene, polyethylene, polyvinylchloride, oriented polystyrene, polyethylene terephthalate, and polylactic acid.

4. The laminate of claim 1, wherein the self-crosslinking acrylic polymer is formed from monomers selected from acrylic acid, methyl acrylic acid, methyl methacrylate, butyl acrylate, butyl methacrylate, styrene, methyl styrene, and combinations thereof.

5. The laminate of claim 1, wherein the self-crosslinking acrylic polymer is a styrene/acrylic ester copolymer.

6. The laminate of claim 1, wherein the self-crosslinking acrylic polymer is the reaction product of a carbonyl-containing monomer and an amine-containing monomer.

7. The laminate of claim 1, wherein the self-crosslinking acrylic polymer is an acrylic emulsion.

8. The laminate of claim 1, wherein the coalescent is an acrylic emulsion.

9. The laminate of claim 1, wherein the ink or coating composition further comprises a colorant.

10. A process for preparing a laminate, comprising the steps of:
    a) providing an ink or coating composition that comprises: a self-crosslinking acrylic polymer having a glass transition temperature of 0° C. or greater, a coalescent, and water;
    b) applying one or more layers of the ink or coating composition to a first substrate to provide a printed side of a coated substrate;
    c) drying the one or more layers of the coated substrate; and
    d) laminating the coated substrate, wherein the printed side of the coated substrate is an inner layer of the laminate.

11. The process of claim 10, wherein laminating the coated substrate comprises applying an adhesive layer to the printed side of the coated substrate and applying a second substrate to the adhesive layer.

12. The process of claim 10, wherein the ink or coating composition is reverse printed on the substrate.

13. The process of claim 10, wherein the substrate is a polymeric substrate selected from oriented polypropylene, polyethylene, polyvinylchloride, oriented polystyrene, polyethylene terephthalate, and polylactic acid.

14. The process of claim 10, wherein the self-crosslinking acrylic polymer is formed from monomers selected from acrylic acid, methyl acrylic acid, methyl methacrylate, butyl acrylate, butyl methacrylate, styrene, methyl styrene, and combinations thereof.

15. The process of claim 10, wherein the self-crosslinking polymer is a styrene/acrylic ester copolymer.

16. The process of claim 10, wherein the self-crosslinking acrylic polymer is the reaction product of a carbonyl-containing monomer and an amine-containing monomer.

17. The process of claim 10, wherein the self-crosslinking polymer is an acrylic emulsion.

18. The process of claim 10, wherein the coalescent is an acrylic emulsion.

19. The process of claim 10, wherein the amount of coalescent present in the ink or coating composition is 2.0 wt % to 20 wt %.

20. The process of claim 10, wherein the ink or coating composition further comprises a colorant.

21. A laminate comprising:
    a) a first substrate having a printed side upon which one or more layers of an ink or coating composition are applied in a reverse printed configuration forming an image or text that is visible when viewed through a non-printed side of the substrate, wherein the ink or coating composition comprises a self-crosslinking acrylic polymer having a glass transition temperature of 0° C. or greater, a coalescent, and water;
    b) a second substrate adhered to the printed side of the first substrate; and
    c) an adhesive bonding the first substrate to the second substrate,
    wherein the ink or coating compositions on the printed side of the first substrate is an inner layer of the laminate and contact the adhesive bonding the first substrate to the second substrate.

22. A laminate of claim 21, wherein the one or more layers of ink or coating composition comprise colored inks or coatings forming the image or text, and a white ink or coating layer, applied to the colored ink or coating layers as a backing layer, wherein the white ink or coating layer coating layer also comprises a self-crosslinking acrylic polymer having a glass transition temperature of 0° C. or greater, a coalescent, and water.

23. A process for preparing a laminate, comprising the steps of:
    a) providing a colored ink or coating composition that comprises: a self-crosslinking acrylic polymer having a glass transition temperature of 0° C. or greater, a coalescent, and water;
    b) applying one or more layers of the colored ink or coating composition to a first substrate to provide a printed side of a coated substrate wherein the one or more layers of the colored ink or coating composition are applied in a reverse printed configuration to form an image or text on a printed side of the coated substrate and is visible when viewed through a non-printed side of the coated substrate;
    c) drying the one or more layers of the coated substrate;
    d) laminating the coated substrate by applying an adhesive layer to the printed side of the coated substrate and applying a second substrate to the adhesive layer.

24. A process according to claim 23, wherein applying the colored ink or coating layers to form the image or text is followed by applying a layer of a white ink or coating backing layer also comprising a self-crosslinking acrylic polymer having a glass transition temperature of 0° C. or greater, a coalescent, and water.

\* \* \* \* \*